United States Patent

Hull

[15] 3,669,955
[45] June 13, 1972

[54] QUATERNARY PYRIDINIUM SALT-STARCH ETHER DERIVATIVES
[72] Inventor: Glenn Arden Hull, Oak Park, Ill.
[73] Assignee: CPC International Inc.
[22] Filed: Dec. 26, 1968
[21] Appl. No.: 787,259

[52] U.S. Cl. .....................260/233.3 R, 106/193, 106/203, 106/213, 106/214, 117/84, 117/161 C, 117/161 L, 117/161 UZ, 117/161 UE, 117/165, 260/71, 260/89.5 A, 260/91.3 VA, 260/209 R, 260/231 R, 260/231 A, 260/233.5
[51] Int. Cl. ........................................................C08b 19/01
[58] Field of Search............... 260/233.3, 89.5 A, 91.3, 231, 260/231 A

[56] References Cited

UNITED STATES PATENTS

| | | | |
|---|---|---|---|
| 2,054,746 | 9/1936 | Granacher | 260/231 |
| 2,876,217 | 3/1959 | Paschall | 260/233.3 |
| 2,995,513 | 8/1961 | Paschall | 210/54 |
| 3,070,594 | 12/1962 | Harris et al. | 260/233.3 |
| 3,472,840 | 10/1969 | Stone | 260/231 |

OTHER PUBLICATIONS

Kirk–Othmer, " Carbohydrates," Encyclopedia of Chemical Technology, pages 146 and 147 (1964), Vol. 4.
International Encyclopedia of Chemical Science (1964), page 999, D. Van Nostrand Co., New York.

Primary Examiner—Donald E. Czaja
Assistant Examiner—M. I. Marquis
Attorney—Frank E. Robbins, James L. Bailey, Janet E. Price, Robert D. Weist, Martha A. Michaels and Dorothy R. Thumler

[57] ABSTRACT

A quaternary pyridinium salt-polyol ether product represented by the formula:

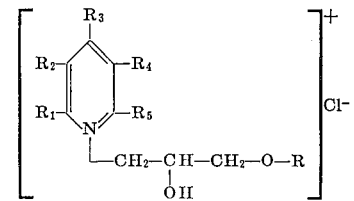

where $R_1$, $R_2$, $R_3$, $R_4$ and $R_5$ are hydrogen or methyl and R is starch.

3 Claims, No Drawings

QUATERNARY PYRIDINIUM SALT-STARCH ETHER DERIVATIVES

Cationic polyol derivatives are useful in a variety of commercial applications, particularly those wherein a relatively high molecular weight material possessing cationic character is desired. For example, in some areas of coagulation activity, the chemical coagulant should possess a substantial number of cationic sites while also having a high enough molecular weight to form flocs of visible size which may be easily separated from the remaining treated liquid. The same requirement of relatively high molecular weight, accompanied by varying degrees of cationic character are required for acceptable activity in improving bursting and tensile strength, elongation, fold endurance, and retention of filler materials of paper. In addition, cationic polyol derivatives are used in the textile industry to increase resistance to abrasion, eliminate static electricity, reduce softener requirements and reduce polyol usage because of better cohesion and adhesion properties.

Quaternary pyridinium salt products find use as germicides in household and commercial cleaning preparations as well as in surgical instrument sterilization procedures.

In view of the above, it becomes an objective of the invention to provide a new cationic polyol derivative comprising a quaternary pyridinium salt-polyol ether.

Another object of the invention is to provide a method of forming said cationic quaternary pyridinium salt-polyol ether.

Still another object of the invention is to provide a new cationic polyol derivative for use in flocculating applications.

Yet another object of the invention is to provide a new cationic polyol derivative for use in paper treating and coating applications.

Another object yet of the invention is to provide a new cationic polyol derivative for use in textile treating applications.

A still further object of the invention is to provide a new quaternary pyridinium salt which may be utilized in germicidal preparations.

An additional object of the invention is to provide a quaternary pyridinium salt as an intermediate in the formation of a quaternary pyridinium salt-polyol ether.

Other objects will appear hereinafter.

In accordance with the invention a new quaternary pyridinium salt and a method of synthesizing said salt have been discovered. Broadly speaking, the product consists of a quaternary pyridinium salt wherein the pyridine moiety is either substituted or unsubstituted and where the nitrogen of the pyridine moiety is attached to a 3-halo-2-hydroxypropyl radical which is also either substituted or unsubstituted. The product may be represented by the following structural formula:

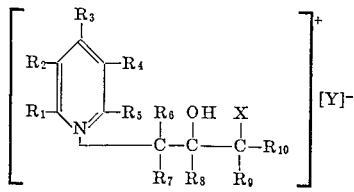

where $R_1$, $R_2$, $R_3$, $R_4$, and $R_5$ are radicals selected from the group consisting of hydrogen, hydroxy, halo, aryl, aralkyl, cycloalkyl, hydroxyalkyl, fluoroalkyl, cyanoalkyl, cycloheteryl, straight chain unsaturated and saturated aliphatic, and branched chain unsaturated and saturated aliphatic; $R_6$, $R_7$, $R_8$, $R_9$, and $R_{10}$ are radicals selected from the group consisting of hydrogen, aryl, aralkyl, cycloalkyl, fluoroalkyl, cyanoalkyl, straight chain unsaturated and saturated aliphatic, and branched chain unsaturated and saturated aliphatic; X is a halogen; and Y is an anion.

In addition, a new cationic quaternary pyridinium salt-polyol ether derivative has been formulated. The new cationic polyol derivative consists, in general, of an ether formed between a polyol and the previously described quaternary pyridinium salt. Said cationic polyol derivative may be represented by the following structural formula:

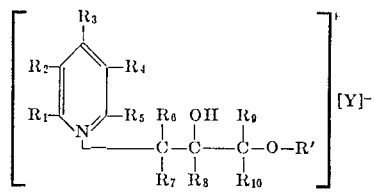

where $R_1$–$R_{10}$ and Y are as defined in the preceding paragraph and R' represents a polyol residue.

The quaternary pyridinium salt is formed by mixing pyridine or a substituted pyridine with an acid and an organic compound containing somewhere therein an α–halo epoxy group and represented by the formula:

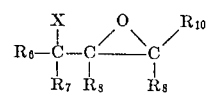

where $R_6$–$R_{10}$ and X are as previously defined.

The quaternary pyridinium salt-polyol ether derivative is formed by making a basic slurry of the quaternary pyridinium salt and a polyol and allowing the slurry to react.

DETAILED DESCRIPTION OF THE INVENTION

QUATERNARY PYRIDINIUM SALT

The preferred method of forming the quaternary pyridinium salt is by mixing equimolar quantities of either pyridine or a substituted pyridine, hydrogen chloride in a water solution, and an organic compound containing somewhere therein an α-halo epoxy group, and either refluxing the reaction mixture or allowing it to stand, preferably while agitating, for sufficient time for the reaction to proceed to completion. Since various substituted pyridines react at different rates in this reaction, no general statement can be made defining the necessity for using specific reaction conditions.

In the most preferred method of forming the quaternary pyridinium salt the pyridine or substituted pyridine is first brought in contact with the hydrochloric acid solution to allow the formation of a quaternary pyridinium hydrochloride compound and the organic compound containing the α–halo epoxy group is then added to and reacts with the reaction mixture.

I have found that the presence of the epoxy group alpha to the halogen atom serves to activate said halogen atom so that it will react readily with the pyridine or substituted pyridine moiety.

The substituents $R_1$, $R_2$, $R_3$, $R_4$, and $R_5$ of the quaternary pyridinium salt product may be hydrogen, hydroxy, halo, aryl, aralkyl, cycloalkyl, hydroxyalkyl, fluoroalkyl, cyanoalkyl, cycloheteryl, straight chain unsaturated and saturated aliphatic, and branched chain unsaturated and saturated aliphatic. Examples of these would be hydrogen, methyl, ethyl, chloro, bromo, perfluoroethyl, cyanomethyl, isopropyl, allyl, cyclohexyl, and phenyl. The substituents $R_6$, $R_7$, $R_8$, $R_9$, and $R_{10}$ of the quaternary pyridinium salt product may be hydrogen, aryl, aralkyl, cycloalkyl, hydroxyalkyl, fluoroalkyl, cyanoalkyl, straight chain unsaturated and saturated aliphatic, and branched chain unsaturated and saturated aliphatic. Examples of these would be hydrogen, methyl, ethyl, benzyl, perfluoroethyl, cyanomethyl, allyl and cyclohexyl; Y may be an anion such as sulfate, phosphate, nitrate, perchlorate, chloride, bromide, iodide, fluoride and acetate.

More preferably, $R_1$, $R_2$, $R_3$, $R_4$, $R_5$, $R_6$, $R_7$, $R_8$, $R_9$, and $R_{10}$ are alkyl radicals or hydrogen; X is a chlorine, bromine, or iodine atom; and Y is a halide.

Most preferably, $R_1$–$R_{10}$ are methyl radicals or hydrogen; X is a chlorine atom; and Y is a chloride ion.

An alternative method for forming the quaternary pyridinium salt product of this invention is by the reaction of a compound of

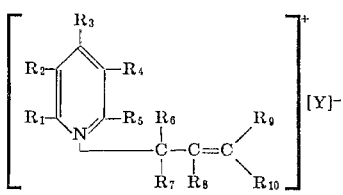

where $R_1$–$R_{10}$ and Y are as defined previously, with a hypohalite, HOX, such as HOCl and HOBr. The product of such a reaction may be a mixture of the quaternary pyridinium salt product previously described and of a quaternary pyridinium salt product of the following formula:

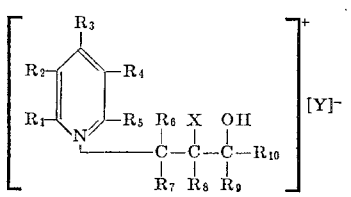

where $R_1$–$R_{10}$, X and Y are as previously defined. A quaternary pyridinium salt product produced by this method should also be useful in the preparation of a quaternary pyridinium salt-polyol ether derivative by the method of this invention.

QUATERNARY PYRIDINIUM SALT-POLYOL ETHER

The new cationic quaternary pyridinium salt-polyol ether product may be represented by the following formula:

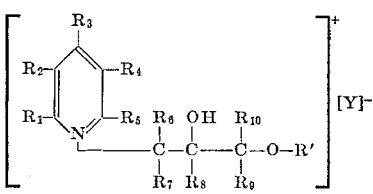

where $R_1$–$R_{10}$ and Y are defined as above and R' is a polyol residue such as starch, cellulose or modified cellulose, glycerol, cyclodextrin, mannitol, pentaerythritol, anhydroenneaheptitol, polypropylene glycol, methylglucoside, sucrose, sorbitol, corn syrup, dextrins, urea formaldehyde resins having reactive N-methylol groups, hydroxyethyl starch, hydroxypropyl starch, hydroxyethyl cellulose, hydroxypropyl cellulose, polyvinyl alcohol, vinyl polymers and copolymers made by polymerizing or copolymerizing hydroxy monomers such as allyl alcohol, hydroxyethyl acrylate, hydroxyethyl methacrylate, hydroxypropyl acrylate and hydroxypropyl methacrylate with other vinyl monomers, etc.

The starches used in practicing the invention may be derived from any vegetable source, such as, for example, corn, wheat, potato, tapioca, rice, sago, and grain sorghum. The waxy starches may also be used. The term "starch" is used broadly herein and encompasses unmodified starch and tailings, and, as well, starch that has been modified by treatment with acids, alkalies, enzymes, heat, etc. Soluble or partially soluble modified starches, dextrins, pregelatinized products, and starch derivatives of different types are also suitable in the process.

As is known, the repeating units in some polyols such as cellulose, starch, cyclodextrin, etc. are anhydroglucose units and may have different degrees of substitution (D.S.) from one to three (three hydroxyls substituted per unit). In a given quantity of a cellulose, starch, or cyclodextrin derivative, there will generally be some carbohydrate units that are not substituted at all (D.S.,O), together with other carbohydrate units that have different degrees of substitution, from 1 to 3. A statistical average is employed to characterize the average D.S. of the entire quantity, although the figure is ordinarily stated as the D.S. rather than the average D.S. The quaternary pyridinium salt-polyol ethers of cellulose, starch, cyclodextrin, and the like prepared according to this invention may have a varying range of D.S. which may be as little as 0.0001, up to the maximum level of 3. Irrespective of the number of molecules of cellulose, starch, cyclodextrin, etc. which are reacted, or the actual sequence of substitution, or the number of carbohydrate units involved, the general formula is intended to represent products where the substitution may occur to different degrees of substitution at all or less than all units in all or less than all cellulose, starch, cyclodextrin, etc. molecules.

The preferred quaternary pyridinium salt-polyol ether of this invention exhibits a D.S. within the range of from about 0.01 to about 1.0. Most preferably said quaternary salt-polyol ether product exhibits a D.S. which falls within the range from about 0.01 to about 0.10.

Preferably, $R_1$–$R_{10}$ are hydrogen or alkyl radicals. Most preferably, they are hydrogen or methyl radicals. R' is preferably a starch residue. Y is preferably a halide ion and most preferably a chloride ion.

The preferred method of making the quaternary pyridinium salt-polyol ether derivative is to make a basic slurry of the quaternary pyridinium salt and the polyol and to allow the slurry to react at room temperature or slightly elevated temperatures for 1–3 days. More preferably, the basic slurry is made in an aqueous solution at a pH which falls within the range of from about 10 to about 14. Most preferably, the pH is adjusted to fall within the range of from about 11 to about 13.

I have found that the presence of the pyridine moiety on a carbon alpha to a hydroxy radical and beta to a halogen atom, or alternatively, alpha to a halogen and beta to a hydroxy radical, which halogen atom and hydroxy radical can be converted by base into an epoxy group alpha to said pyridine moiety, is essential to the successful reaction of a quaternary pyridinium salt with a polyol to form a quaternary pyridinium salt-polyol ether product.

A coating preparation may be made from the cationic quaternary pyridinium salt-polyol ether product of this invention. The amounts of the various substituents of a coating preparation utilizing the cationic quaternary pyridinium salt-polyol ether product are naturally strongly dependent upon the type and amount of cationic polyol, the type of inorganic pigment, and the process of application of the coating, as well as the specific properties desired in the finally coated paper. Generally speaking, the coating color contains 20-70 percent solids; including 30-60 percent of inorganic metallic pigments such as clay, talc, titanium dioxide, blanc fixe, powdered tin, precipitated chalk, satin white, ground limestone, etc.; and 5-25 percent of the binder of the invention, based on total solids weight. The above percentage figures are expressed in weight percent. It is understood, of course, that other known binders may be used along with the cationic quaternary pyridinium salt-polyol ether binder material herein defined without departing from the scope of the invention.

The actual introduction of the new coating preparations described herein in treating paper can be carried out in a variety of ways. Thus, for example, one may use coating members such as an air knife, application roll, a bar wrapped with a wire, a "trailing blade" and a sealing press.

The following examples illustrate specific preparations of the quaternary pyridinium salt derivative and of the quaternary pyridinium salt-polyol ether derivative. These examples are meant to be illustrative and the invention, of course, is not to be limited thereto. All parts and percentages are by weight unless expressly stated to be otherwise.

EXAMPLE 1

N-(3-Chloro-2-Hydroxypropyl) Pyridinium Chloride

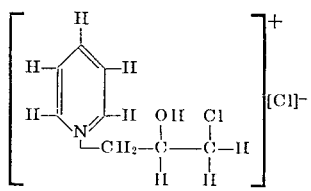

This example demonstrates the preparation of a quaternary pyridinium salt product utilizing unsubstituted pyridine as a reactant. A quaternary pyridinium salt product produced in this manner may be used as a disinfectant.

Pyridine (0.2 mole) was put into a reaction vessel. To this was added, first 100 milliliters of a 2N solution of hydrogen chloride then 0.2 moles of epichlorohydrin. The reactants were stirred in a closed vessel for twenty-four hours at room temperature. The resulting clear solution was then evaporated under vacuum, at 0.2 millimeters mercury pressure, and at a temperature of 95° C. until a viscous syrup resulted. The crude syrup crystallized within a three day period. The crystals were washed with acetone and dried. The yield of dry crystals was 63 percent of that calculable theoretically. The crystals melted at 106° C. to 107° C. The analysis results were as follows. Calculated percent: C = 46.2, H = 5.3, N = 6.7, Cl = 34.2, O = 7.7. Found percent: C = 46.0, H = 5.2, N = 6.9, Cl = 33.8, O = 8.1 (by difference).

EXAMPLE 2

N-(3-Chloro-2-Hydroxypropyl) Pyridinium Chloride

The preparation described in Example 1 was repeated extending reaction time to 40 hours and 72 percent of the theoretically calculable yield of crystalline product was obtained. This product showed a melting point of 107.5° C. – 108° C.

This example demonstrates that somewhat increased yields may be obtained by extending reaction times.

EXAMPLE 3

N-(3-Chloro-2-Hydroxypropyl) 2,4,6-Trimethyl Pyridinium Chloride

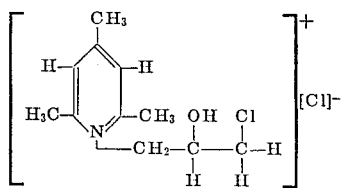

2,4,6-Trimethylpyridine (0.5 mole) was placed in a reaction vessel. To this were added, successively, 250 milliliters of 2N hydrochloric acid and 0.5 mole of epichlorohydrin. The resulting solution was then stirred in a closed reaction vessel heated to 105° C. for 16 hours. The solution was then evaporated, at 0.2 millimeters mercury pressure, until crystallization occurred. The crude product amounted to 60 percent of the theoretically calculable yield.

The efficient use of a tri-substituted pyridine as a reactant is demonstrated in this example.

EXAMPLE 4

N-(3-Chloro-2-Hydroxypropyl) 2,6-Dimethyl Pyridinium Chloride

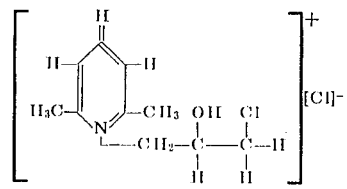

250 milliliters of 2N hydrochloric acid and 0.5 mole of epichlorohydrin were added successively to 0.5 mole of 2,6-dimethylpyridine in a closed reaction vessel. The resulting solution was refluxed for 18 hours at 100° C., the pH having first been adjusted to 5.0.

On evaporation a crude product was obtained which represented 57 percent of the theoretically calculable yield.

This example demonstrates that a di-substituted pyridine may be used as a reactant in the revealed procedure.

EXAMPLE 5

N-(3-Chloro-2-Hydroxypropyl) 2-Methyl Pyridinium Chloride

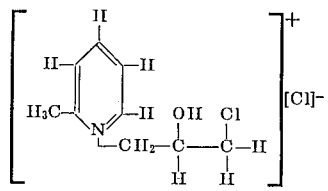

Equimolar quantities of 2-methylpyridine, hydrogen chloride (as a 2N solution), and epichlorohydrin were mixed together in a reaction vessel. The reactants were heated to 95° C. for 4 hours with stirring and then the resulting solution was evaporated. The crude product obtained represented 75 percent of the theoretically calculable yield. The crystals melted between 170° C. and 173° C. The efficient use of a mono-substituted pyridine as a reactant is demonstrated in this example.

EXAMPLE 6

Reaction of N-(3-Chloro-2-Hydroxypropyl) Pyridinium Chloride with Starch

N-(3-Chloro-2-hydroxypropyl) pyridinium chloride (0.1 mole) was reacted in an aqueous slurry with unmodified corn starch. The pH was adjusted to 12 by the addition of sodium hydroxide and the reaction was carried out at room temperature. A cationic starch product was obtained with a degree of substitution (D.S.) of 0.014. The product showed a Scott viscosity of 1.5 g/92 seconds.

This example demonstrates that a quaternary pyridinium salt produced according to the procedure of this invention will react with a polyol to form a cationic quaternary pyridinium salt-polyol ether product. A cationic polyol ether produced in this manner may be used as a flocculating agent, as a paper or textile additive, or as the binder in a paper coating color composition.

EXAMPLE 7

Reaction of N-(3-Chloro-2-Hydroxypropyl) 2,6-Dimethyl Pyridinium Chloride with Starch Crude N-(3-chloro-2-hydroxypropyl) 2,6-dimethyl pyridinium chloride (0.12 mole), the preparation of which is described in Example 4, and 40 grams of sodium sulfate were added to 200 milliliters of water. To this, one mole of unmodified corn starch was added, and then 120 milliliters of 2.033N NaOH was added drop-wise with agitation. The resulting pH was 11.6. The reaction mixture was heated to 50° C. for 16 hours. The pH at the end of that time had dropped to 10.9. The slurry was filtered and the filtrate was washed with two liters of water and then with 100 milliliters of methanol. Analysis of the resulting product indicated a degree of substitution of 0.03.

This example indicates that a quaternary pyridinium salt produced according to the process of this invention does not have to be purified prior to reaction with a polyol. The reaction with a polyol of said quaternary pyridinium salt where the pyridine moiety is di-substituted is also demonstrated.

EXAMPLE 8

Reaction of N-(3-Chloro-2-Hydroxypropyl) 2-Methyl Pyridinium Chloride with Starch A solution of 10 grams of sodium chloride in 100 milliliters of water was prepared. To this was added 81 grams of unmodified corn starch. A second solution was made up consisting of 25.6 milliliters of 2.033 normal sodium hydroxide to which 11.6 grams of N-(3-chloro-2-hydroxypropyl) 2-methyl pyridinium chloride had been added. The two solutions were combined and an additional 19.6 milliliters of 2.033N NaOH was added drop-wise to the reaction mixture. The resulting pH of the solution was 11.4. The reactants were agitated at room temperature for 24 hours at the end of which time the pH had changed to 11.1. The solution was then acidified to a pH of 6.2 using 16 milliliters of 2.423N HCl. The resulting cationic starch product had a degree of substitution of 0.025 and exhibited a Scott viscosity of 1.0 g/36 seconds.

The reaction of a quaternary pyridinium salt, with a polyol where the pyridine moiety is mono-substituted, is demonstrated by this example.

EXAMPLE 9

Formation and Testing of Coating Color Binder

Corn starch acid modified to 80 fluidity (For definition of fluidity see Starch: Chemistry and Technology, Vol. II, P 219, editors R.L. Whistler and E.F. Paschall, Academic Press, New York and London, 1967), was etherified with N-(3-chloro-2-hydroxypropyl) pyridinium chloride to a D.S. level of 0.035 by the method of Example 6 and was incorporated into a 45 percent solids coating on paper. The coating showed excellent dry binding strength both with and without the addition of glyoxal as a cross-binder and a very good water resistance when used in connection with glyoxal. The coating color Brookfield viscosity resulting from the use of the derivative was very satisfactory both with and without glyoxal. The following table summarizes the results of the testing.

| Glyoxal, % | Brookfield Viscosity (centipoise) (110°F) (100rpm) | Dennison Wax Pick | Transmittance % |
|---|---|---|---|
| 0 | 536—No. 3 Spindle | 14 | 0.0 |
| 10 | 2230—No. 6 Spindle | 14 | 80.0 |

The transmittance reported is a measure of the wet-rub resistance of a four inch by four inch sample of paper coated as described above. In the procedure for determining wet-rub resistance the sample is scrubbed 20 times with a wet rubber block. The sample and the rubber block are then washed with water and the washings are collected in a flask. The water in the flask is diluted to 100 milliliters total volume and the transmittance of the resulting solution is determined at 4,250 Angstrom in a 60 milliliter cell using a Fisher electrophotometer II. 100 percent Transmittance would indicate that the wet-rub resistance of the sample being tested was so great that none of the coating had been rubbed off by the rubber block.

The quaternary pyridinium salt-polyol ether product described above is useful in a broad number of applications. This product is particularly useful as a flocculating agent, to size and coat paper, and to treat textiles so as to increase water and oil resistance, etc.

The just described quaternary pyridinium salt-polyol ether derivative is particularly useful for treating a wide variety of cellulosic fibrous materials to improve their properties. Illustrative of these are textiles and other cellulosic derivative materials such as paper. Thus, this material may be used to size both paper and yarn, and as well may be used to finish off already woven textile materials. The composition may be employed to treat both synthetic and natural fibers or combinations of these such as rayon, nylon, acrylics, polyesters, cotton, wool, etc.

The quaternary pyridinium salt product of this invention may be used as an intermediate in the formation of the quaternary pyridinium salt-polyol ether product previously described and as a disinfectant.

While the invention has been described in connection with specific embodiments thereof, it will be understood that it is capable of further modification, and this application is intended to cover any variations, uses, or adaptations of the invention following, in general, the principles of the invention and including such departures from the present disclosures as come within known or customary practice in the art to which the invention pertains and as may be applied to the essential features hereinbefore set forth, and as fall within the scope of the invention and the limits of the appended claims.

The invention is hereby claimed as follows:

1. A quaternary pyridinium salt-polyol ether product represented by the formula:

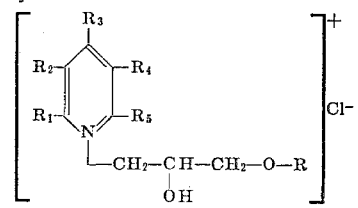

where $R_1$, $R_2$, $R_3$, $R_4$ and $R_5$ are hydrogen or methyl and R is starch.

2. The quaternary pyridinium salt-polyol ether product of claim 1 wherein $R_1$, $R_2$, $R_3$, $R_4$ and $R_5$ are hydrogen.

3. The quaternary pyridinium salt-polyol ether product of claim 1 wherein $R_2$ and $R_4$ are hydrogen.

* * * * *